United States Patent
Kosako

(10) Patent No.: US 6,538,699 B1
(45) Date of Patent: Mar. 25, 2003

(54) REAL-IMAGE FINDER

(75) Inventor: Kosei Kosako, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/221,571

(22) Filed: Dec. 29, 1998

(30) Foreign Application Priority Data

Jan. 7, 1998 (JP) .......................................... 10-001509

(51) Int. Cl.⁷ ............................................. H04N 5/225
(52) U.S. Cl. ........................ 348/341; 396/378; 396/380
(58) Field of Search ............................. 348/341, 333.01, 348/333.03, 333.09; 396/296, 380, 386, 378

(56) References Cited

U.S. PATENT DOCUMENTS

| | | | |
|---|---|---|---|
| 4,209,247 A | | 6/1980 | Urano et al. |
| 4,527,875 A | * | 7/1985 | Shibata ........................ 396/284 |
| 4,831,399 A | * | 5/1989 | Tsurukawa et al. .......... 396/148 |
| 5,160,954 A | * | 11/1992 | Suzuki et al. ................ 396/377 |
| 5,250,969 A | | 10/1993 | Abe et al. |
| 5,257,055 A | * | 10/1993 | Cho et al. .................... 396/378 |
| 5,337,109 A | * | 8/1994 | Ogawa ......................... 396/379 |
| 5,548,366 A | * | 8/1996 | Katano ......................... 359/819 |
| 5,628,037 A | * | 5/1997 | Tsuyuki et al. .............. 396/140 |
| 5,701,534 A | | 12/1997 | Taguchi et al. |
| 5,752,107 A | * | 5/1998 | Hasushita et al. ........... 396/296 |
| 5,822,626 A | | 10/1998 | Kosako |
| 5,847,881 A | | 12/1998 | Yano |
| 5,999,756 A | * | 12/1999 | Nishimura et al. .......... 396/296 |
| 6,130,714 A | * | 10/2000 | Abe et al. .................... 348/335 |

FOREIGN PATENT DOCUMENTS

| | | | | |
|---|---|---|---|---|
| JP | 06-289460 A | * | 10/1994 | ........... G03B/13/12 |
| JP | 09-179168 A | * | 7/1997 | ........... G03B/13/06 |

* cited by examiner

Primary Examiner—Andrew Christensen
Assistant Examiner—Eric Wisdahl
(74) Attorney, Agent, or Firm—Greenblum & Bernstein, P.L.C.

(57) ABSTRACT

A real-image finder includes an objective optical system which forms an image of an object onto a primary image forming surface; an ocular optical system through which the object image formed on the primary image forming surface can be viewed; and an image erecting optical system which inverts the object image formed by the objective optical system, in the vertical and horizontal directions. The real-image finder includes: a rectangular body which includes a main frame having a generally U-shape section which is uniform in the optical axis direction, the main frame being provided with a pair of front and rear end openings in the optical axis direction and a side opening, and a separate cover which is adapted to close the side opening of the main frame; a field frame that is supported within the rectangular body on the primary image forming surface; a pair of transparent members which close the pair of front and rear end openings of the rectangular body; at least one sealing member for sealing a contact portion between the main frame and the cover, and for sealing a gap between the rectangular body and the transparent members.

22 Claims, 6 Drawing Sheets

REAL-IMAGE FINDER

BACKGROUND OF THE INVENTION

1. Field of the Invention

The present invention relates to a real-image finder.

2. Description of the Related Art

As is well known, a conventional real-image finder includes an objective optical system which forms an object image on a primary image forming surface in a field frame, an ocular optical system through which the object image formed on the primary image forming surface can be viewed, and an image erecting optical system which inverts the image formed by the objective optical system in the vertical and horizontal directions. In the real-image finder, if foreign matter (such as dust) sticks to the primary image forming surface, the dust can be viewed together with the object image through the ocular optical system. One solution to this problem is to isolate (seal) the finder entirely whereby no foreign matter can enter the finder. However, it is difficult to perfectly isolate the finder due the complicated structure thereof.

The assignee of the present application has proposed another solution in U.S. Pat. No. 5,822,626, in which a seal block unit (dust-proof block) is provided, which only seals the vicinity of the image forming surface on which the object image is formed by the objective optical system. The dust-proof block is made of a hollow rectangular body which opens at the front and rear ends thereof in the optical axis direction and which is provided on the front and rear end surfaces thereof with peripheral grooves in which sealing members, each being in the form of a string (cord), are press fitted. The sealing members are held between the end surfaces of the hollow block and transparent members (e.g., lenses) to provide a dust-proof structure. A liquid crystal display (LCD) is provided in the vicinity of the image forming surface within the hollow block. If the actual picture surface is not identical to the field of view of the finder (for example, upon photographing at close-up mode or panoramic mode), the voltage to be applied is controlled whereby a portion of the liquid crystal display (LCD) becomes clouded to vary the size of the field frame. The hollow block is provided with an insertion hole through which conductors connected to the LCD extend. The insertion hole is also sealed by a sealing member.

In the case where a switching device for switching the size of the field frame is formed by the LCD mentioned above, the seal block can be rectangular. However, in a mechanical switch in which the size of the field frame is altered mechanically, if the seal block which seals the vicinity of the image forming surface is rectangular, it is difficult to arrange the field frame size switching mechanism within the rectangular block. In general, it is difficult to arrange any member including the field frame size switching member in a rectangular block.

SUMMARY OF THE INVENTION

It is an object of the present invention to provide a real-image finder having a dust-proof structure in which the vicinity of the image forming surface is sealed, and components can be easily assembled or incorporated in the vicinity of the sealed image forming surface.

To achieve the object mentioned above, according to the present invention, there is provided a real-image finder including an objective optical system which forms an image of an object onto a primary image forming surface; an ocular optical system through which the object image formed on the primary image forming surface can be viewed; and an image erecting optical system which inverts the object image formed by the objective optical system, in the vertical and horizontal directions. The real-image finder includes: a rectangular body which includes a main frame having a generally U-shape section which is uniform in the optical axis direction, the main frame being provided with a pair of front and rear end openings in the optical axis direction and a side opening, and a separate cover which is adapted to close the side opening of the main frame; a field frame that is supported within the rectangular body on the primary image forming surface; a pair of transparent members which close the pair of front and rear end openings of the rectangular body; at least one sealing member for sealing a contact portion between the main frame and the cover, and for sealing a gap between the rectangular body and the transparent members.

Preferably, the main frame includes, on the outer surface of two opposing sides thereof, a plurality of engagement projections; and the cover comprising a plurality of plate-like extensions having holes in which the engagement projections are engaged, wherein the main frame and the cover are engaged by the engagement of the engagement projections and the holes of the extensions.

Preferably, the main frame of generally U-shape section is provided with a pair of opposed parallel wall portions, the cover covering the side opening; wherein the main frame includes: a pair of linear grooves which extend in a direction parallel with the optical axis and which are provided on the open side of the opposed parallel wall portions of the main frame; at least one sealing member being fitted into the linear grooves.

Preferably, the rectangular body constituting the main frame and the cover further includes: a pair of peripheral grooves in which the transparent members are loosely fitted and which are formed on the inner surface of the main frame, the peripheral grooves being located at different positions in the optical axis direction and on opposite sides of the primary image forming surface; at least one sealing member being inserted into the peripheral grooves to stably hold the transparent members in the peripheral grooves and to seal the gap between the transparent members and the peripheral grooves.

Preferably, the linear grooves are connected at the opposed ends thereof to the respective peripheral grooves.

Preferably, the sealing members include a first sealing member which is continuously arranged in one of the peripheral grooves and one of the linear grooves, and a second sealing member which is continuously arranged in the other peripheral groove and the other linear groove.

Preferably, the sealing members are made of a resilient material.

Preferably, the sealing members are made of an air permeable material.

Preferably, the sealing members are in the form of a cord.

Preferably, a field frame switching mechanism is further provided which mechanically switches the size of the field frame in the rectangular body.

Preferably, the field frame switching mechanism includes: a pair of U-shaped grooves which are provided on the side-opening side of the parallel wall portions of the main frame, the pair of U-shaped grooves lying in a line perpendicular to the optical axis; and a movable field frame member separate from the field frame, supported in the U-shaped grooves so as to rotate about rotation shafts between a lowered position (in which the movable field frame member is located on the optical axis in the close vicinity of the primary image forming surface) and a raised position (in which the movable field frame member is retracted from the optical axis).

Preferably, the U-shaped grooves intersect the linear grooves; the rotation shafts of the movable field frame member projecting above the bottom surfaces of the linear grooves to reduce the distance from the cover; and the sealing members inserted in the linear grooves being located on top of the rotation shafts.

Preferably, one of the U-shaped grooves extends to the outside of the rectangular body, wherein the movable field frame member can be rotated from the outside of the rectangular body via the above-mentioned U-shaped groove.

Preferably, one of the rotation shafts extends along the one of the U-shaped grooves wherein one of the rotation shafts includes a rotation operation member having an operation pin.

Preferably, an association member is also provided, the association member including a pair of pin holding arms which hold therebetween the operation pin in order to lower and raise the movable field frame member.

Preferably, at least one of the pair of transparent members is a lens.

According to another aspect of the present invention there is provided a real-image finder having an objective optical system which forms an image of an object onto a primary image forming surface; an ocular optical system through which the object image formed on the primary image forming surface can be viewed; and an image erecting optical system which inverts the object image formed by the objective optical system, in the vertical and horizontal directions; the real-image finder including: a rectangular body which includes a main frame having a generally U-shape section which is uniform in the optical axis direction, the main frame being provided with a pair of front and rear end openings in the optical axis direction and a side opening, and a separate cover which is adapted to close the side opening of the main frame; a field frame that is supported within the rectangular body on the primary image forming surface; a pair of transparent members which close the pair of front and rear end openings of the rectangular body; a first sealing member which is continuously arranged for sealing a part of a contact portion between the main frame and the cover, and also for sealing a gap between the rectangular body and one of the pair of transparent members; a second sealing member which is continuously arranged for sealing the other part of the contact portion, and also for sealing a gap between the rectangular body and the other of the pair of transparent members.

Preferably, the main frame includes, on the outer surface of two opposing sides thereof, a plurality of engagement projections; and the cover including a plurality of plate-like extensions having holes in which the engagement projections are engaged, wherein the main frame and the cover are engaged by the engagement of the engagement projections and the holes of the extensions.

Preferably, a pair of linear grooves which extend in a direction parallel with the optical axis and which are provided on the side-opening side of the opposed parallel wall portions of the main frame are also provided; the first and second sealing members being fitted into each of the linear grooves; and a pair of peripheral grooves in which the transparent members are loosely fitted and which are formed on the inner surface of the main frame, the peripheral grooves being located at different positions in the optical axis direction and on opposite sides of the primary image forming surface; the first and second sealing members being inserted into the peripheral grooves to stably hold the transparent members in the peripheral grooves and to seal the gaps between the transparent members and the peripheral grooves; wherein the linear grooves are connected at the opposed ends thereof to the respective peripheral grooves.

Preferably, the sealing members are made of a resilient material.

Preferably, the sealing members are made of an air permeable material.

Preferably, the sealing members are in the form of a cord.

According to another aspect of the present invention, there is provided a seal unit for a real-image finder having an objective optical system and an ocular optical system, the seal unit including: a rectangular body which is composed of a main frame of a generally U-shape section which is uniform in the optical axis direction, the main frame being provided with a pair of end openings in the optical axis direction and an open side, and a separate cover which is adapted to close the open side of the main frame; a field frame that is supported in the rectangular body so that the field frame is positioned on a primary image forming surface of the objective optical system; a pair of transparent members which close the pair of end openings of the rectangular body; at least one sealing member for sealing a contact portion between the main frame and the cover, and for sealing a gap between the rectangular body and the transparent members.

Preferably, the main frame includes a groove formed inside wall thereof to receive said pair of transparent members before the separate cover is attached to the main frame, the groove being positioned on a plane perpendicular to the optical axis.

Preferably, a sealing member is inserted between the bottom of the groove and the peripheral surface of the pair of transparent members.

The present disclosure relates to subject matter contained in Japanese Patent Application No. 10-1509 (filed on Jan. 7, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
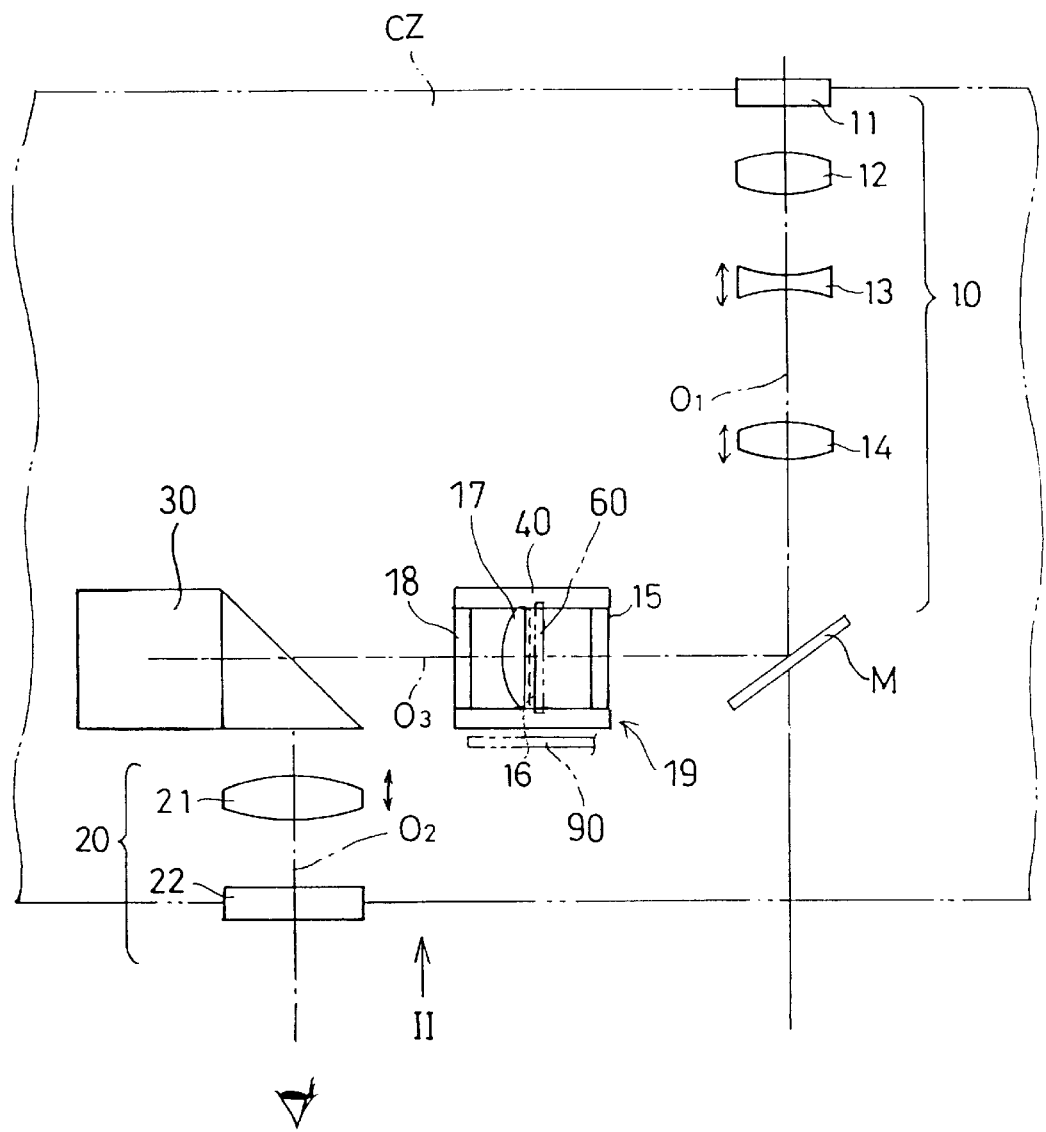
FIG. 1 is a plan view of a real-image finder according to the present invention.
Figure 2:
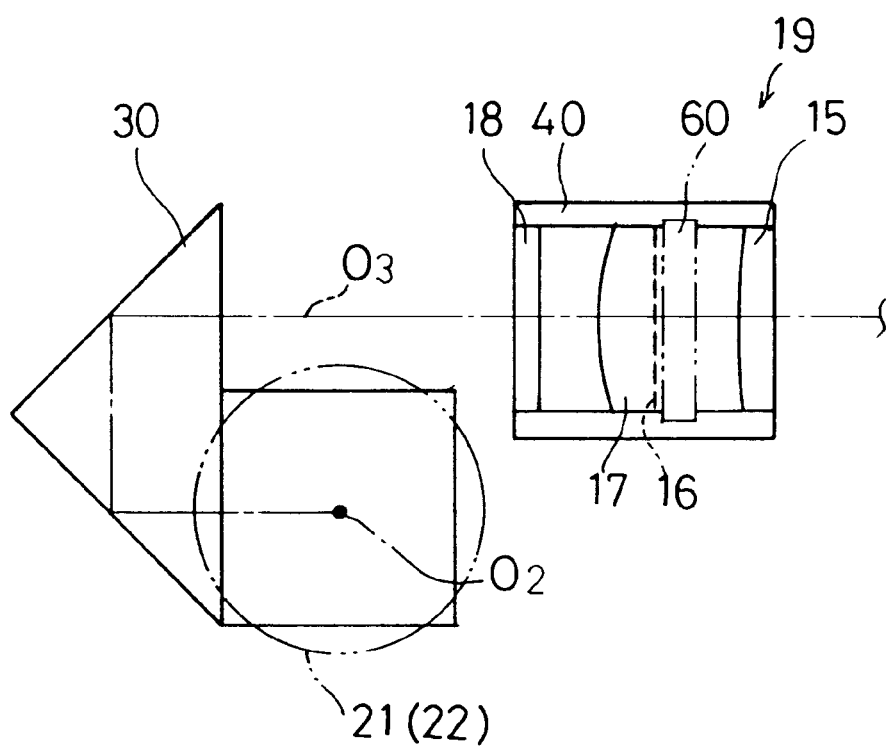
FIG. 2 is an end view viewed from an arrow II in FIG. 1.

FIGS. 1 and 2 show an example of a real-image finder according to the present invention. The illustrated real image finder is a zoom finder applied to a compact zoom camera CZ. The optical axis O1 of an objective optical system 10 is parallel with the optical axis O2 of an ocular optical system 20. Incident light along the light path of the objective optical system 10 is bent by 90° by a mirror M and travels along the optical axis O3, and then made incident upon a porro prism 30. The light is reflected by three reflection surfaces of the porro prism 30, and travels along the optical axis O2. The four reflection surfaces including the mirror M and the three reflection surfaces of the porro prism 30 constitute an image erecting optical system.

The objective optical system 10 includes stationary lenses 11, 12 and movable lenses 13 and 14 which can be utilized to perform zooming. The objective optical system 10 on the optical axis O1 forms a real image of an object to be viewed on a primary image forming surface 16.

A plane-parallel plate (transparent member) 15, the primary image forming surface 16, a focusing lens 17, and a plane-parallel plate (transparent member) 18 are located on the optical axis O3 and are sealed by a seal unit 19. A panoramic field member 60 is provided in the vicinity of the primary image forming surface 16 within the seal unit 19. The ocular optical system 20 includes a diopter adjusting lens 21 and a stationary lens 22. The diopter adjusting lens 21 is supported so as to be moveable along the optical axis O2.

FIGS. 3 through 9 show the internal structure of the seal unit 19. The seal unit 19 is composed of a rectangular body 40 which is composed of a main frame 41 having a generally U-shaped section which has an opening at the front and rear ends thereof in the optical axis direction and at one side and a cover 42 which covers the side opening of the main frame 41. The main frame 41 is provided, on the opposed wall portions 41a and 41b thereof, with two pairs of (four in total) projections 69, respectively, which engage with the cover 42. The cover 42 is provided with a pair of retainer plates 70 (plate-like extensions) extending along the outer sides of the main frame 41. The retainer plates 70 (plate-like extensions) are each provided with engagement slots 71 in which the engagement projections 69 are engaged. When the engagement projections 69 are engaged in the engagement slots 71, the cover 42 is secured to the main frame 41. In this state, the front end (on the object side) and rear end (on the porro prism side) of the rectangular body 40 define openings 43 and 44 in which light passes therethrough.

Figure 5:
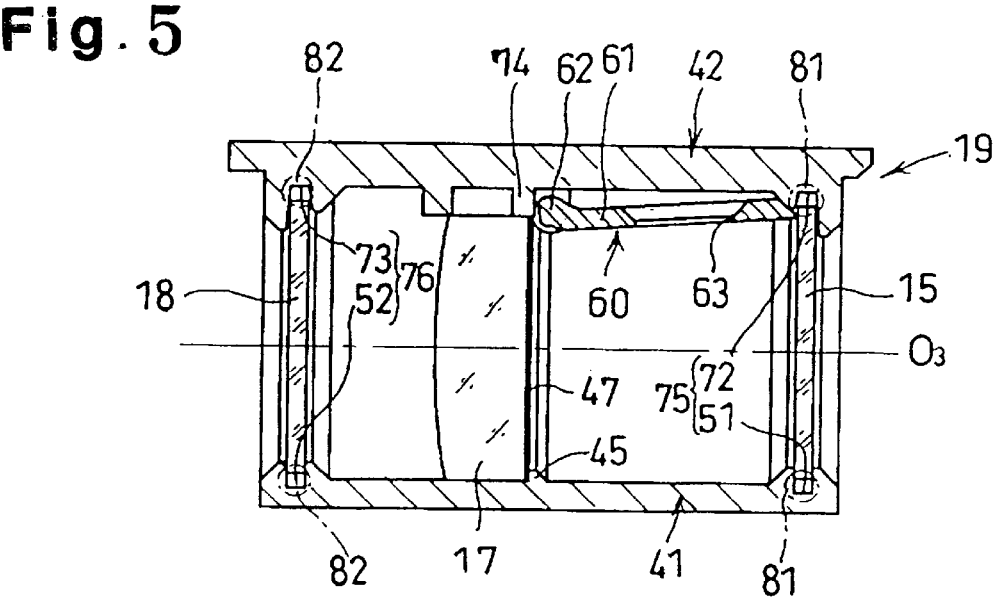
FIG. 5 is a sectional view of a seal unit at a standard field of view, taken along the line A—A in FIG. 3.
Figure 7:
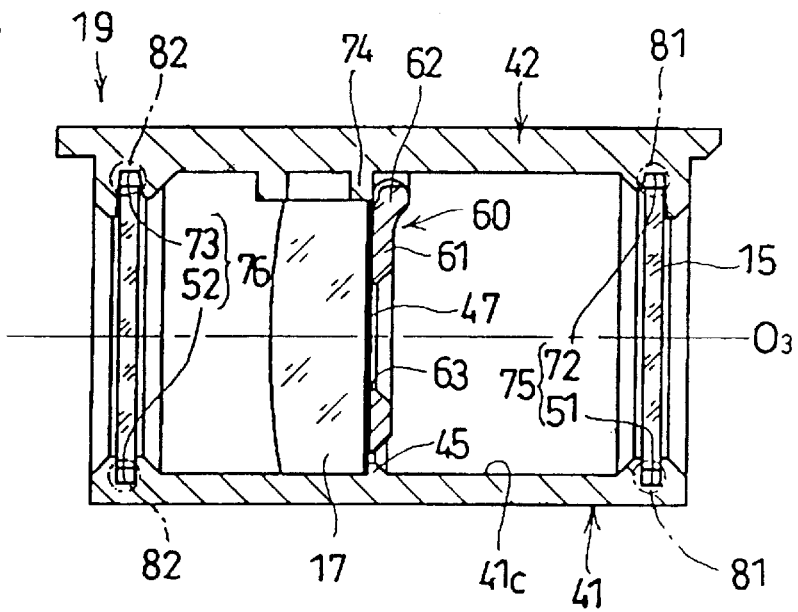
FIG. 7 is a sectional view of a seal unit at a panoramic field of view, taken along the line A—A in FIG. 3.

The main frame 41 is provided on a substantially central portion thereof with positioning ribs 45 along the inner wall surfaces of the opposed wall portions 41a and 41b and the inner wall surface of the bottom 41c. The main frame 41 is also provided with a pair of lens holding grooves 46 which are formed by cutting parts of the opposed wall portions 41a and 41b at the opening 44 side with respect to the positioning ribs 45. The focusing lens 17 is provided on the side thereof with a pair of support projections (not shown) corresponding to the lens holding grooves 46, so that when the support projections are fitted in the lens holding grooves 46, the axial position of the focusing lens 17 in the optical axis direction is determined. In this position, the planar front end of the focusing lens 17 is spaced from the positioning ribs 45 at a slight distance (FIGS. 5 and 7). A standard field frame 47 having an opening (not shown) which defines the field frame whose size corresponds to the standard picture plane size is held in the space defined between the focusing lens 17 and the positioning ribs 45. The standard field frame 47 is located at a position substantially equal to the primary image forming surface 16. When the cover 42 is attached, the focusing lens 17 and the standard field frame 47 are held in a direction perpendicular to the optical axis O3 by holding projections 74 provided on the cover 42 (FIGS. 5 and 7). Note that the focusing lens 17 is provided, on the front surface contacting with the standard field frame 47, with a focus frame (not shown) evaporated thereto.

The main frame 41 is provided therein with lower receiving grooves 51 and 52 in which the plane-parallel plates 15 and 18 are fitted and which are located slightly inside the openings 43 and 44, respectively. The lower receiving grooves 51 and 52 lie in planes substantially normal to the optical axis O3 along the inner peripheral surfaces of the opposed wall portions 41a and 41b and the bottom 41c.

The cover 42 is provided on its lower surface with upper receiving grooves 72 and 73 corresponding to the lower receiving grooves 51 and 52 of the main frame 41, so that when the cover 42 is mounted to the main frame 41, the lower receiving groove 51 and the upper receiving groove 72, and the lower receiving groove 52 and the upper receiving groove 73 are connected, respectively, to define a pair of peripheral grooves 75 and 76 which extend along the entire inner periphery of the end portions of the seal unit 19.

The plane-parallel plates 15 and 18 are held in the peripheral grooves 75 and 76, respectively. The plane-parallel plates 15 and 18 are made of a transparent material, such as glass or plastic, and each has a thickness (in the direction of the optical axis O3) corresponding to the width of the peripheral grooves 75 and 76. On the other hand, the plane-parallel plates 15 and 18 are loosely fitted in the peripheral grooves 75 and 76 in the direction perpendicular to the optical axis O3, wherein when the first and second sealing members 81 and 82 are press-fitted in the peripheral grooves 75 and 76, the plane-parallel plates 15 and 18 are firmly held. The first and second sealing members 81 and 82 are made of a porous material, such as porous Teflon which is air permeable and possess good elasticity properties.

The opposed wall portions 41a and 41b of the main frame 41 are provided near the side opening (of the main frame 41) with a pair of through-holes 53a and 53b which connect to the lower receiving groove 51 and proceed to an external portion of the main frame 41; and similarly, a pair of through-holes 54a and 54b which connect to the lower receiving groove 52 and proceed to an external portion of the main frame 41.

The opposed wall portions 41a and 41b of the main frame 41 are provided, on the side opening portion thereof covered by the cover 42, with a pair of linear grooves 55a and 55b, respectively, in which the resilient first and second sealing members 81 and 82 can be press-fitted and extend in the direction parallel with the optical axis O3. The linear groove 55a connects, at one end thereof, to the lower receiving groove 51 in the vicinity of the front through-hole 53a, and at the other end, to the lower receiving groove 52 in the vicinity of the rear through-hole 54a. The linear groove 55b is connected, at one end thereof, to the lower receiving groove 51 in the vicinity of the through-hole 53b, and at the other end, to the lower receiving groove 52 in the vicinity of the through-hole 54b. In other words, a pair of linear grooves 55a and 55b are connected, at the opposed ends thereof, to a pair of the peripheral grooves 75 and 76, respectively. The width of the peripheral grooves 75 and 76 is substantially identical to the width of the linear grooves 55a and 55b.

Note that a pair of lens holding grooves 46 are located closer to the optical axis O3 than the linear grooves 55a and 55b.

The main frame 41 has also provided near the side opening thereof, with shaft support grooves (U-shaped grooves) 56 and 57 of a generally U-shape section on opposing wall portions 41a and 41b, respectively; the position of the support grooves corresponding to the primary image forming surface 16 position with respect to the optical axis direction O3. The shaft support groove 56 extends from the inside of the opposed wall portion 41a to the outside thereof, and the shaft support groove 57 extends from the linear groove 55b to the inner wall surface of the opposed wall portion 41b. The shaft support grooves 56 and 57 are deeper than the bottoms of the linear grooves 55a and 55b at the overlapping portions between the shaft support grooves 56, 57 and the linear grooves 55a, 55b. The opposed wall portion 41a is provided on the outer surface thereof with an arc rotation support 58 at the lower end portion of the shaft support groove 56.

The shaft support grooves 56 and 57 rotatably support a rotation shaft 62 of a panoramic field member 60. The panoramic field member 60 is provided with a laterally elongated panoramic field opening 63 formed substantially at the center portion of a panoramic field member 61 which extends from the rotation shaft 62 to correspond to the internal shape of the main frame 41 in cross-section. The panoramic field member 60 is rotatable about the rotation shaft 62 between a lowered position (FIG. 7) in which the panoramic field member 61 is located on the optical axis O3, and a raised position (FIG. 5) in which the panoramic field member 61 is retracted from the optical axis O3. In the lowered position, the panoramic field member 61 is adjacent to the standard field frame 47 wherein the field of view which can be viewed through the ocular optical system 20 corresponds to the laterally elongated panoramic size field defined by the panoramic field opening 63. In the raised position of the panoramic field member 60, since the panoramic member 60 is not located on the optical axis, the field of view corresponds to the field defined by the standard field frame 47.

Figure 8:
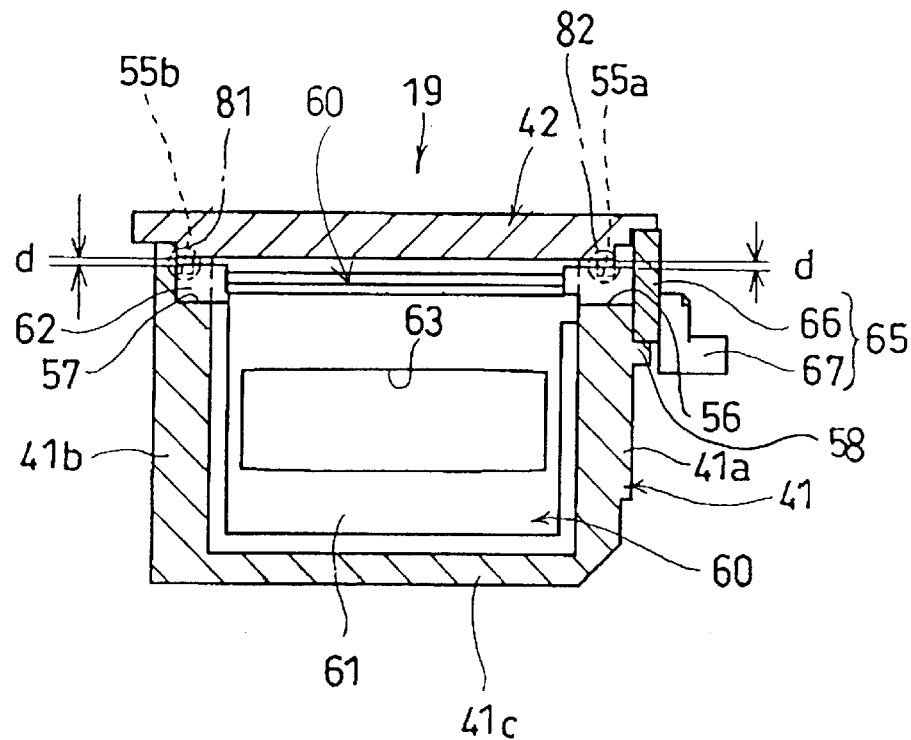
FIG. 8 is a sectional view taken along the line VIII—VIII in FIG. 6.

The upper portion of the rotation shaft 62 supported by the shaft support grooves 56 and 57 in a horizontal state is located higher than the bottom surfaces of the linear grooves 55a, 55b. There is a slight gap "d" between the uppermost portion of the rotation shaft 62 and the cover 42 (FIG. 8).

The wall portion 41a of the rectangular body 40 is provided on the outer surface thereof with a rotation operation member 65 which is adapted to rotate the panoramic field member 60 about the rotation shaft 62. The rotation operation member 65 includes a circular disc portion 66 secured to the rotation shaft 62 supported in the shaft support groove 56 and an operation pin 67 which projects from the circular disc at a position eccentric from the center of rotation thereof. The circular disc 66 is supported at the peripheral surface thereof by the rotation support 58.

The first and second sealing members 81 and 82 and the seal unit 19 are assembled as follows:

The focusing lens 17, the standard field frame 47 and the panoramic field member 60 are mounted to the main frame 41 before the cover 42 is mounted. The focusing lens 17 is secured to the lens holding groove 46 by means of an adhesive filled in the holding groove 46.

Thereafter, the first and second sealing members 81 and 82 are attached to the seal unit 19. The resilient first and second sealing members 81 and 82 are in the form of a string (cord) and have a diameter greater than the width of the peripheral grooves 75 and 76 or the linear grooves 55a and 55b. The first and second sealing members 81 and 82, are indicated by a chain line in the form of a circle in FIGS. 5, 7 and 8 which represents the shape thereof in section before they are inserted in the corresponding grooves (i.e., the sealing members are in a free state). The sealing members can be press-fitted in the grooves by elastically deforming the same.

Figure 3:
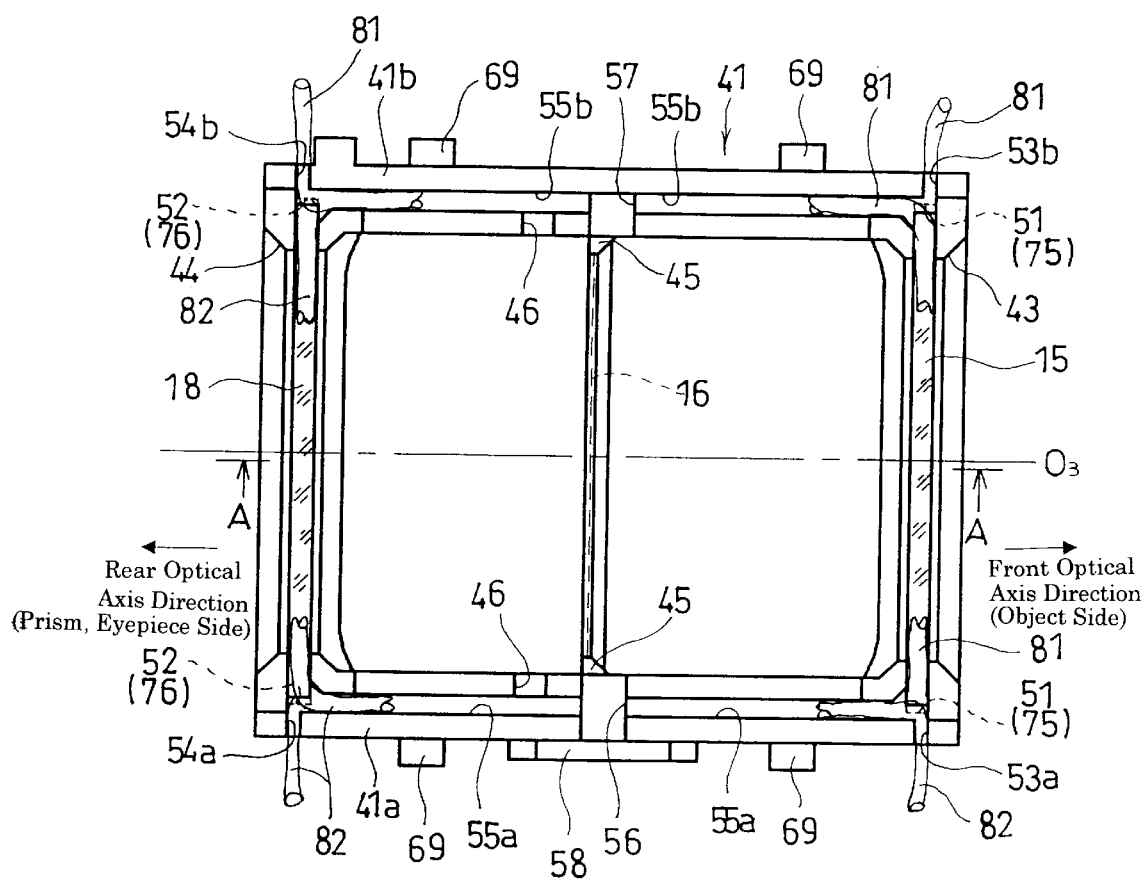
FIG. 3 is a plan view of a lower frame of a seal unit disposed in the vicinity of a primary image forming surface.
Figure 9:
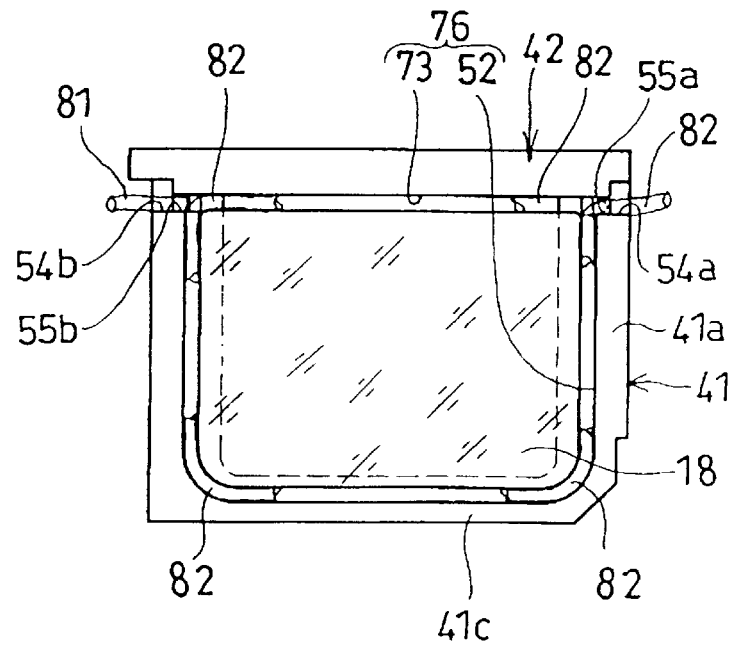
FIG. 9 is a sectional view taken along the line IX—IX in FIG. 6.

The plane-parallel plate 18 is fitted in the lower receiving groove 52 in which the (second) sealing member 82 has been press-fitted. For example, as shown in FIGS. 3 and 9, the (second) sealing member 82 extends in the lower receiving groove 52 wherein one end of the sealing member protrudes from the through-hole 54a. When the plane-parallel plate 18 is fitted in the lower receiving groove 52, the (second) sealing member 82 is held between the peripheral edge of the plane-parallel plate 18 and the bottom of the lower receiving groove 52 and is press-fitted in the lower receiving groove 52, whereby the gap between the plane-parallel plate 18 and the lower receiving groove 52 can be sealed. A predetermined length of the other end of the (second) sealing member 82 protrudes outward from the lower receiving groove 52 in the vicinity of the through-hole 54b.

Thereafter, the (second) sealing member 82 is bent at the vicinity of the wall portion 41b to surround the upper end of the plane-parallel plate 18 and extends to the vicinity of the through-hole 54a. Namely, the (second) sealing member 82 surrounds the four peripheral surfaces of the plane-parallel plate 18 but the upper end of the plane-parallel plate 18 is just placed on the (second) sealing member 82.

The (second) sealing member 82 is bent toward the opening 43 (front end) of the main frame 41 and extends along the linear groove 55a to the end thereof in the optical axis direction. The (second) sealing member 82 protrudes outward at the other end thereof from the through-hole 53a.

The outer peripheral surface of the rotation shaft 62 of the panoramic field member 60 supported by the shaft supporting groove (U-shaped groove) 56 projects slightly from the bottom of the linear groove 55a, and the (second) sealing member 82 along the linear groove 55a extends on the rotation shaft 62.

Similarly, the plane-parallel plate 15 is fitted in the lower receiving groove 51 in which the (first) sealing member 81 in the form of a string (cord) has been fitted. The (first) sealing member 81 protrudes outward at one end thereof from the through-hole 53b away from the (second) sealing member 82 and extends along the lower receiving groove 51. When the plane-parallel plate 15 is fitted in the lower receiving groove 51, the (first) sealing member 81 is press-fitted in the lower receiving groove 51, whereby the gap between the plane-parallel plate 15 and the lower receiving groove 51 can be sealed. The (first) sealing member 81 extends on the upper end of the plane-parallel plate 15 and reaches the vicinity of the through-hole 53b and is bent toward the opening 44 (rear end) of the main frame 41 to extend along the linear groove 55b. The (first) sealing member 81 protrudes outward at the rear end of the linear groove 55b in the optical axis direction from the main frame 41 through the through-hole 54b. Similarly to the (second) sealing member 82, the (first) sealing member 81 extends on the outer periphery of the rotation shaft 62 which is higher than the bottom of the linear groove 55b and which is supported in the shaft supporting groove 57.

Thereafter, the cover 42 is mounted to the main frame 41. Consequently, the (first) sealing member 81 extending along the upper end of the plane-parallel plate 15 is press-fitted in the upper receiving groove 72 formed in the lower surface of the cover 42. Thus, the (first) sealing member 81 is pressed and elastically deformed to seal the gap between the plane parallel plate 15 and the upper receiving groove 72. Likewise, the (second) sealing member 82 extending along the upper end of the plane-parallel plate 18 is press-fitted in the upper receiving groove 73 to seal the gap between the plane parallel plate 18 and the upper receiving groove 73. Namely, the gap between the peripheral edge of the plane parallel plate 15 and the peripheral groove 75 which supports the same is sealed by the (first) sealing member 81 and the gap between the peripheral edge of the plane-parallel plate 18 and the peripheral groove 76 is sealed by the (second) sealing member 82.

The (second) sealing member 82 extending along the linear groove 55a and the (first) sealing member 81 extending along the linear groove 55b are press-fitted in the linear grooves 55a and 55b by the lower surface of the cover 42 to seal the connection between the main frame 41 and the cover 42. Note that since the gap "d" between the rotation shaft 62 and the cover 42 in the set position of the rotation shaft 62 is small (FIG. 8), the elastic deformation of the first and second sealing members 81 and 82 at this portion is large. Consequently, the rotation shaft 62 is firmly held due to the resilient restoring force to stably hold the panoramic field member 60 in the raised position or the lowered position.

Finally, the end portions of the first and second sealing members 81 and 82 projecting from the through-holes 53a, 53b and 54a, 54b are cut. In the sealed state of the seal unit 19, the front and rear end openings of the rectangular body 40 in the optical axis direction are closed by the plane-parallel plates 15 and 18 whose peripheral edges are in turn sealed by the first and second sealing members 81 and 82, respectively. The first and second sealing members 81 and 82 also seal the connection between the main frame 41 and the cover 42. Therefore, the seal unit 19 is completely isolated, whereby no foreign matter can enter into the unit 19. Since the first and second sealing members 81 and 82 are made of a porous material having air permeability, the air connection between the closed inside space of the seal unit 19 and the outside is established, and hence no pressure difference due to a change in the temperature occurs between the inside and outside of the seal unit 19.

Upon assembly of the seal unit 19, it is preferable that the first and second sealing members 81 and 82 be press-fitted in advance in the lower receiving grooves 51, 52 or the linear grooves 55a, 55b to some extent and be pressed by the plane-parallel plates 15, 18 or the cover 42.

The seal unit 19 thus assembled is placed in the finder optical system shown in FIG. 1. The compact zoom camera CZ is composed of an association member 90 provided along the side of the seal unit 19, a picture plane size selection switch (not shown) which can be externally actuated from the outside of the camera, and a picture plane size switching mechanism (not shown) which switches the picture plane between the standard size and the panoramic size in association with the operation of the selection switch. The plate-like association member 90 is mechanically associated (engaged) with the selection switch and is moved in a direction substantially parallel with the optical axis O3 in accordance with the operation of the selection switch. The association member 90 is provided with a pair of pin holding arms 91 (FIGS. 4 and 6) which hold therebetween the operation pin 67 of the rotation operation member 65 which is exposed to the outside of the seal unit 19.

Figure 4:
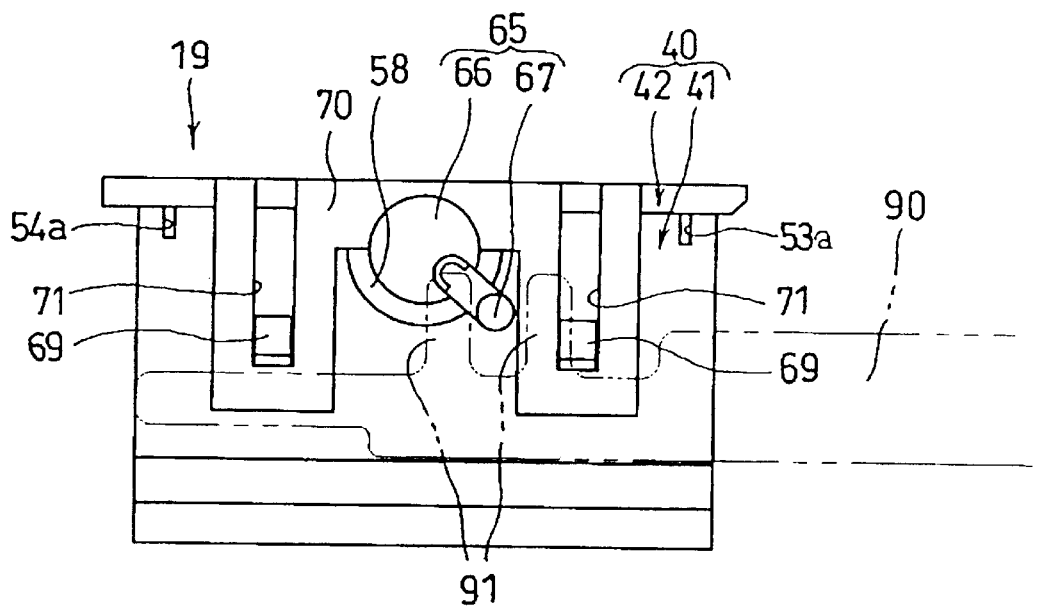
FIG. 4 is a side view of a seal unit at a standard field of view.

When the standard picture plane size is selected, the association member 90 is in a position shown in FIG. 4. In this position, the panoramic field member 60 is moved to the raised position shown in FIG. 5 through the operation pin 67 held between the pin holding arms 91. Namely, the field of view which can be viewed through the ocular optical system 20 is defined by the standard field frame 47.

Figure 6:
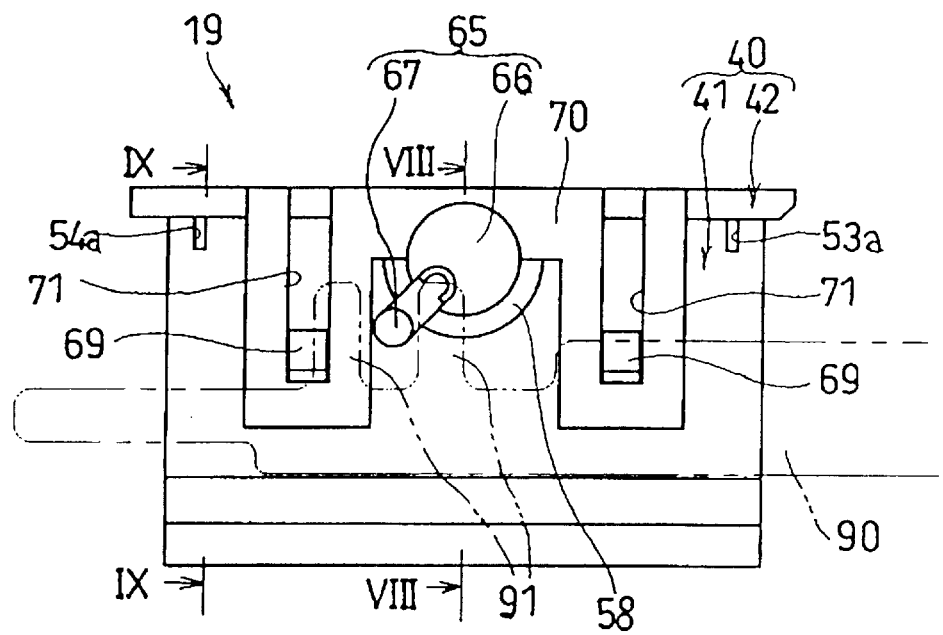
FIG. 6 is a side view of a seal unit at a panoramic field of view.

When the picture plane is switched to the panoramic size by the picture plane size selection switch, the association member 90 is moved to a position shown in FIG. 6. As a result of the movement of the association member 90, the rotation shaft 62 is rotated through the operation pin 67, wherein the panoramic field member 60 is moved to the lowered position shown in FIG. 7. Consequently, the field of view which can be viewed through the ocular optical system 20 is defined by the panoramic field aperture 63.

As can be seen from the foregoing, in the present invention, since the dust-proof block is composed of the generally U-shaped main frame and a cover separate therefrom, it is possible to easily arrange the mechanical field-switching mechanism in the confined space of the dust proof block. Moreover, since the sealing operation is completed at one time by fitting the cover, the assembly can be more simply and easily carried out than an assembly operation in which the sealing member or the transparent member is mounted to the front and rear end faces of the rectangular block.

The present invention is not limited to the above mentioned embodiments. In the illustrated embodiment, the field frame switching mechanism is rotated about the rotation shaft 62 perpendicular to the optical axis O3 to move the panoramic field member 61 between a position in which it is located on the optical axis and another position in which the plate member is retracted from the optical axis. In this system, the drive mechanism for the field frame is simple, and the space in which the retracted plate member is accommodated is small, thus resulting in a realization of a simple and small seal unit 19. However, the basic idea of the present invention resides in an easy arrangement of a member which cannot be easily arranged in a conventional rectangular seal unit, by attaching the cover after the assembly of the internal elements is completed. Therefore, the field frame switching mechanism within the seal unit, according to the present invention is not limited to that of the illustrated embodiment. Namely, the facilitation of the assembly can be expected from an arrangement other than the illustrated embodiment. Moreover, the present invention can be applied to a member other than the field frame switching mechanism, to be arranged in the seal unit. For instance, upon incorporation of the focusing lens 17, the focusing lens can be easily assembled only by inserting the same in the main frame 41 which opens at the upper end thereof.

Moreover, the transparent members provided at the rear and front ends of the seal unit are not limited to the plane-parallel plates and can be, for example, lenses.

As can be understood from the above discussion, according to the present invention, a real-image finder in which the image forming surface and the surroundings thereof are sealed to provide a dust-proof structure and components being easily mounted to the dust-proof structure can be obtained.

What is claimed is:
1. A real-image finder comprising an objective optical system which forms an image of an object onto a primary image forming surface; an ocular optical system through which the object image formed on the primary image forming surface can be viewed; and an image erecting optical system which inverts the object image formed by the objective optical system, in the vertical and horizontal directions; said real-image finder comprising:

a rectangular body which is comprised of a main frame having a generally U-shape section which is uniform in the optical axis direction, said main frame being provided with a pair of front and rear end openings in the optical axis direction and a side opening, and a separate cover which is adapted to close said side opening of the main frame;

a field frame that is supported within said rectangular body on said primary image forming surface;

a pair of transparent members which close said pair of front and rear end openings of the rectangular body;

at least one sealing member for sealing a contact portion between the main frame and the cover, and for sealing a gap between the rectangular body and the transparent members;

a field frame switching mechanism which mechanically switches the size of the field frame in the rectangular body, wherein said field frame switching mechanism comprises:

a pair of U-shaped grooves which are provided on the side-opening side of said parallel wall portions of said main frame, said pair of U-shaped grooves lying in a line perpendicular to the optical axis; and a movable field frame member separate from said field frame, supported in said U-shaped grooves so as to rotate about rotation shafts between a lowered position, in which the movable field frame member is located on the optical axis in the close vicinity of the primary image forming surface, and a raised position, in which the movable field frame member is retracted from the optical axis;

said U-shaped grooves intersecting linear grooves; said rotation shafts of said movable field frame member projecting above the bottom surfaces of the linear grooves to reduce the distance from the cover; and said at least one sealing member being inserted in the linear grooves and being located on top of the rotation shafts.

2. A real-image finder according to claim 1, wherein said main frame comprises, on the outer surface of two opposing sides thereof, a plurality of engagement projections; and said cover comprising a plurality of plate-like extensions having holes in which the engagement projections are engaged, wherein the main frame and the cover are engaged by the engagement of the engagement projections and the holes of the extensions.

3. A real-image finder according to claim 2, wherein said main frame of generally U-shape section is provided with a pair of opposed parallel wall portions, said cover covering said opening; and wherein said linear grooves are a pair of linear grooves which extend in a direction parallel with the optical axis and which are provided on the side opening of said opposed parallel wall portions of said main frame; said at least one sealing member being fitted into said linear grooves.

4. A real-image finder according to claim 3, wherein said rectangular body comprising said main frame and said cover further comprises:

a pair of peripheral grooves in which said transparent members are loosely fitted and which are formed on the inner surface of said main frame, said peripheral grooves being located at different positions in the optical axis direction and on opposite sides of said primary image forming surface; said at least one sealing member being inserted into said peripheral grooves to stably hold said transparent members in said peripheral grooves and to seal said gap between said transparent members and said peripheral grooves.

5. A real-image finder according to claim 4, wherein said linear grooves are connected at the opposed ends thereof to the respective peripheral grooves.

6. A real-image finder according to claim 5, wherein said at least one sealing m ember comprise s a first sealing member which is continuously arranged in one of said peripheral grooves and one of said linear grooves, and a second sealing member which is continuously arranged in the other peripheral groove and the other linear groove.

7. A real-image finder according to claim 6, wherein said first and second sealing members are made of a resilient material.

8. A real-image finder according to claim 6, wherein said first and second sealing member s are made of an air permeable material.

9. A real-image finder according to claim 6, wherein said first and second sealing members are in the form of a cord.

10. A real-image finder according to claim 1, wherein one of said U-shaped grooves extends to the outside of said rectangular body, wherein the movable field frame member can be rotated from the outside of said rectangular body via said one U-shaped groove.

11. A real-image finder according to claim 10, wherein one of said rotation shafts extends along said one of said U-shaped grooves wherein said one of said rotation shafts comprises a rotation operation member having an operation pin.

12. A real-image finder according to claim 11, further comprising an association member, said association member comprising a pair of pin holding arms which hold therebetween said operation pin in order to lower and raise said movable field frame member.

13. A real-image finder according to claim 1, wherein at least one of said pair of transparent members is a lens.

14. A real-image finder comprising an objective optical system which forms an image of an object onto a primary image forming surface; an ocular optical system through which the object image formed on the primary image forming surface can be viewed; and an image erecting optical system which inverts the object image formed by the objective optical system, in the vertical and horizontal directions; said real-image finder comprising:

a rectangular body which is comprised of a main frame having a generally U-shape section which is uniform in the optical axis direction, said main frame being provided with a pair of front and rear end openings in the optical axis direction and a side opening, and a separate cover which is adapted to close said side opening of the main frame;

a field frame that is supported within said rectangular body on said primary image forming surface;

a pair of transparent members which close said pair of front and rear end openings of the rectangular body;

a first sealing member which is continuously arranged for sealing a part of a contact portion between said main frame and said cover, and also for sealing a gap between said rectangular body and one of said pair of transparent members;

a second sealing member which is continuously arranged for sealing the other part of said contact portion, and also for sealing a gap between said rectangular body and the other of said pair of transparent members; and a movable field frame member, separate from said field frame, which rotates about rotation shafts between a lowered position, in which the movable field frame member is located on the optical axis in the close vicinity of the primary image forming surface, and a raised position, in which the movable field frame member is retracted from the optical axis.

15. A real-image finder according to claim 14, wherein said main frame comprises, on the outer surface of two opposing sides thereof, a plurality of engagement projections; and said cover comprising a plurality of plate-like extensions having holes in which the engagement projections are engaged, wherein the main frame and the cover are engaged by the engagement of the engagement projections and the holes of the extensions.

16. A real-image finder according to claim 14, further comprising:
    a pair of linear grooves which extend in a direction parallel with the optical axis and which are provided on the side-opening side of said opposed parallel wall portions of said main frame; said first and second sealing members being fitted into each of said linear grooves; and
    a pair of peripheral grooves in which said transparent members are loosely fitted and which are formed on the inner surface of said main frame, said peripheral grooves being located at different positions in the optical axis direction and on opposite sides of said primary image forming surface; said first and second sealing members being inserted into said peripheral grooves to stably hold said transparent members in said peripheral grooves and to seal said gaps between said transparent members and said peripheral grooves; wherein said linear grooves are connected at the opposed ends thereof to the respective peripheral grooves.

17. A real-image finder according to claim 14, wherein said sealing members are made of a resilient material.

18. A real-image finder according to claim 14, wherein said sealing members are made of an air permeable material.

19. A real-image finder according to claim 14, where said sealing members are in the form of a cord.

20. A seal unit for a real-image finder having an objective optical system and an ocular optical system, said seal unit comprising:
    a rectangular body which is composed of a main frame of a generally U-shape section which is uniform in the optical axis direction, said main frame being provided with a pair of end openings in the optical axis direction and an open side, and a separate cover which is adapted to close the open side of the main frame;
    a field frame that is supported in said rectangular body so that the field frame is positioned on a primary image forming surface of said objective optical system;
    a pair of transparent members which close the pair of end openings of the rectangular body;
    at least one sealing member for sealing a contact portion between the main frame and the cover, and for sealing a gap between the rectangular body and the transparent members; and
    a movable field frame member, separate from said field frame, which rotates about rotation shafts between a lowered position, in which the movable field frame member is located on the optical axis in the close vicinity of the primary image forming surface, and a raised position, in which the movable field frame member is retracted from the optical axis.

21. A seal unit for a real-image finder according to claim 20, wherein said main frame comprises a groove formed on an inside wall thereof to receive one of said pair of transparent members before the separate cover is attached to the main frame, said groove being positioned on a plane perpendicular to the optical axis.

22. A seal unit for a real-image finder according to claim 21, wherein the at least one sealing member is inserted between the bottom of the groove and the peripheral surface of said one of said pair of transparent members.

\* \* \* \* \*